K. L. REYNOLDS.
OIL SEAL GAS SEPARATOR.
APPLICATION FILED JULY 26, 1921.
1,432,208.
Patented Oct. 17, 1922.
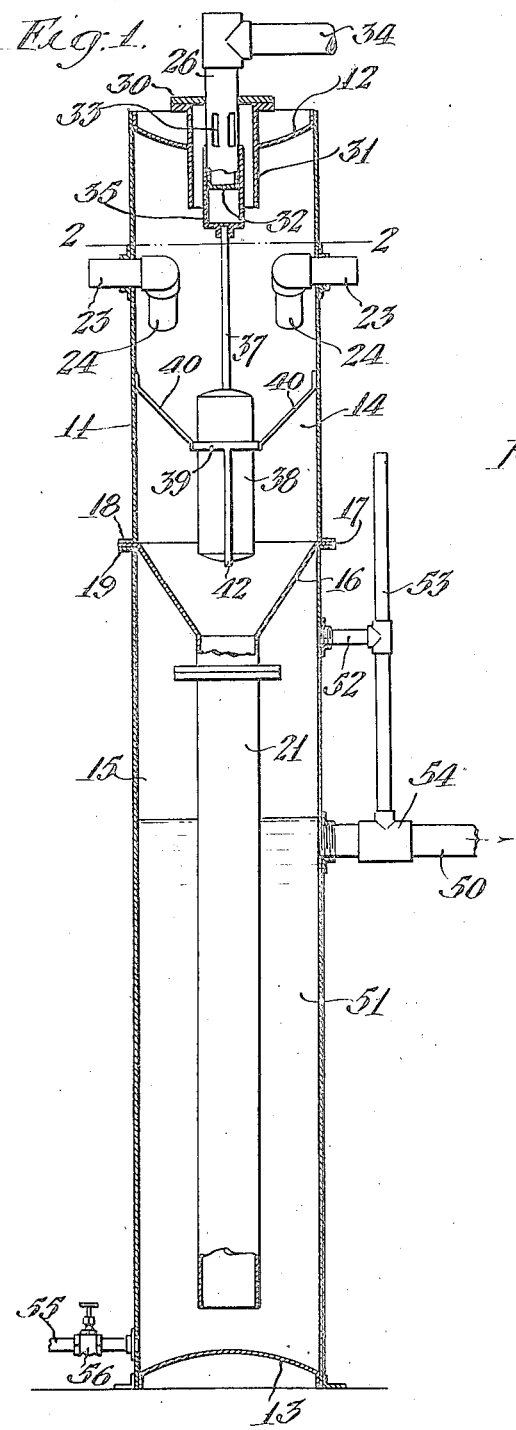
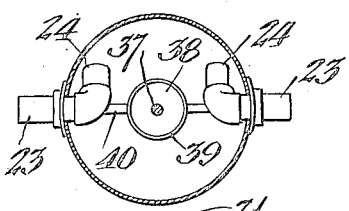
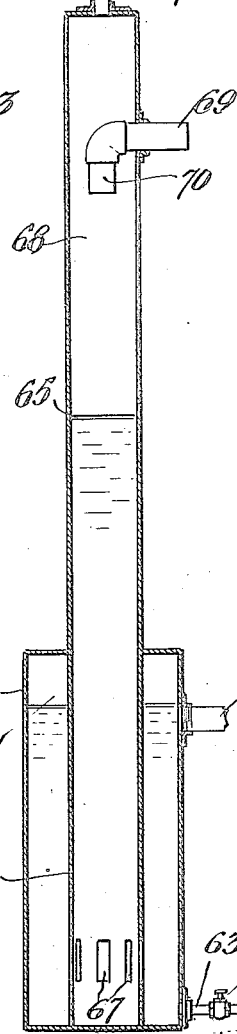
Inventor
Kenyon L. Reynolds
by Graham & Harris
, Attorneys Patented Oct. 17, 1922.

1,432,208

UNITED STATES PATENT OFFICE.

KENYON L. REYNOLDS, OF BRECKENRIDGE, TEXAS, ASSIGNOR TO WALLACE AND BROOKS, INCORPORATED, A CORPORATION OF DELAWARE.

OIL-SEAL GAS SEPARATOR.

Application filed July 26, 1921. Serial No. 487,767.

*To all whom it may concern:*

Be it known that I, KENYON L. REYNOLDS, a citizen of the United States, residing at Breckenridge, in the county of Stephens and State of Texas, have invented a new and useful Oil-Seal Gas Separator, of which the following is a specification.

My invention relates to the art of producing petroleum oil and is more particularly a separating device by means of which the gas which is intermingled with the oils as it comes from the well is separated from the oil.

The principal objects of my invention are; first, to produce a separator of the class described of simple form and construction in which the separation of the gas from the oil is made with a minimum amount of back pressure on the well, and; second, the production of a device in which during the ordinary operation of the device a separation of the oil and gas may be made without the use of any mechanically operated devices depending for their operation upon oil levels, velocities, pressures or vacuums.

Referring to the first object above mentioned, it will be understood that in nearly all oil fields it is the primary desire of the operators to avoid back pressure on their wells as in many instances a few pounds back pressure will frequently cause a well to stop producing.

The reason for the second object is that in common forms of traps now used reliance is had solely upon some mechanically operating device which is operated or dependent upon the oil levels, velocity or pressures and any such device frequently gets out of order resulting in failure of the separator to function.

In my separator, I depend upon an oil seal which is formed when the trap is first filled with oil and which I have found under general conditions all that is necessary in the production of a separator of great efficiency. However, in some instances an emergency float valve may be used on the gas outlet, but I do not consider that the use of such valve is essential to the operation of the separator under ordinary conditions, it being only intended to take care of extraordinary conditions which may arise should the character of the well change quickly.

Other objects and advantages will appear hereinafter from the following specification and drawings.

Referring to the drawings, which are for illustrative purposes only,

Fig. 1 is a vertical sectional view of a separator embodying a form of my invention.

Fig. 2 is a cross sectional plan view on line 2—2, Fig. 1, and

Fig. 3 is a vertical sectional view of a modified form of my invention.

The separator shown in Figs. 1 and 2 consists of a vertically arranged cylindrical shell or casing 11 which is made oil and gas tight, such casing having a head 12 and bottom plate 13. The casing 11 is made in two parts, the upper part comprising an oil and gas separating chamber and the lower part 15 an oil collection chamber, such chambers being separated from each other by an oil delivery spout 16, the flange 17 of which extends between the circular flanges 18 and 19 of the upper and lower parts respectively of the shell 11. Connected to and extending downwardly from the spout 16 is a leg or oil discharge pipe 21, the lower open end of which extends to a point adjacent to the bottom of the shell.

Means are provided for delivering oil and gas from a well or wells into the separating chamber 14 and consist of oil inlet pipes 23, the inner ends of which extend downwardly, as shown at 24. The means for withdrawing or removing gas from the separating chamber consists of a gas outlet pipe 26 which extends through a cover 30 on the upper end of a nipple 31, which nipple extends through and is welded to the head 12 of the shell. The lower end of the pipe 26 is closed, as indicated at 32, and such pipe at a point below the cover 30 is provided with a series of openings 33 by means of which the gases pass from the chamber 14 into the outlet pipe, being carried from such outlet pipe through a pipe 34 to any desired storage (not shown).

Slidably mounted upon the pipe 26 is an open ended cylinder 35 arranged to extend slidably over the lower end of such pipe and by covering the openings 33 regulate the volume of gas admitted to the pipe 26.

The cylinder 35 is mounted on the upper end of a rod 37, the lower end of such rod being connected to a cylindrical float 38 which is vertically slidable in a guide ring 39 mounted on straps 40, the ends of which are secured to the side of the shell 11. The downward movement of such float is limited by means of a strap 42, the ends of which are secured to the ring 39, the strap passing under the lower end of the float 38.

Oil is withdrawn from the oil collection chamber through an oil outlet pipe 50 which is arranged with respect to the bottom of the shell 29 to hold a body of oil indicated at 51 in the oil collection chamber, such body of oil forming a seal.

The chamber 15 above the oil is vented by means of a small pipe 52 which connects with a vertical stand pipe 53, the lower end of such stand pipe being connected into a T 54 in the pipe 50 thereby also venting the pipe 50. The pipe 53 also acts as an overflow pipe as will be readily understood.

55 designates a bleeder pipe at the bottom of the oil collection chamber 15, such pipe being provided with a hand operated valve 56.

Referring particularly to Figs. 1 and 2, in operation the commingled oil and gas from the well is discharged into the separating chamber 14 through the pipe 23, the oil descending in such chamber into the spout 16 and into the oil discharge pipe or leg 21, from which pipe it is discharged into the oil collection chamber 15. In the chamber 15 the oil rises to a level at or above the oil outlet pipe 50 so that the lower end of the leg 21 is submerged in the body of oil in the collection chamber. The gas, as it separates from the oil in the separating chamber, is withdrawn through the pipe 26.

In the form of my invention designated in Fig. 3, I utilize what may be termed a lower cylindrical casing 60 which forms an oil collection chamber 61, such oil collection chamber having an oil outlet pipe 62 and a bleeder pipe 63, the latter being arranged at the bottom of such chamber and provided with a valve 64.

65 designates an upper cylindrical casing or shell which has a leg 66 extending to the bottom of the shell 60, such leg being provided with a series of oil discharge openings 67 to which oil from the upper or separating chamber is discharged into the oil collection chamber, the oil in such chamber forming a seal, as the oil outlet pipe 62 of the collection chamber is above the openings 66 in the leg.

With respect to the form of apparatus shown in Fig. 3, commingled oil and gas are delivered from the well into the separating chamber 68 by means of the oil inlet pipe 69, the inner end of which is turned downwardly as indicated at 70. The chamber 68 is also provided with a gas outlet pipe 71 by means of which gas is removed from the separating chamber just referred to.

I have stated above that it is desirable to have little or no pressure in the separator against the well and it will be noted that the head of oil in the separator limits the pressure placed on the well by the separator. It is desirable in some instances to place a partial vacuum on the separator and it will be understood that by connecting any well known form of exhauster (not shown) to the gas outlet pipe, that a partial vacuum may be maintained in the separating chamber. This vacuum is limited by the head of oil in the leg or oil discharge pipe of the separating chamber between the oil outlet pipe of the collection chamber and the oil inlet pipe of the separating chamber. Under these circumstances, it will be noted that the float operated device for partially closing the gas outlet will not function unless a vacuum is maintained in the separating chamber sufficient to cause the level of the oil in such chamber to rise high enough to operate such float, that is, move the float upwardly and cause the cylinder to move over the gas outlet openings in the pipe 26.

In the form of separator shown in Fig. 3, it will be noted that the separating chamber in proportion to the collection chamber is of greater height than that shown in Figs. 1 and 2, thereby allowing a greater vacuum head to be maintained in such form of device and permitting the operation of such device without any float regulating mechanism for controlling the gas outlet.

In this form of separator, the vacuum head is much greater than the pressure head. This is done to permit the vacuum head to be greater than it will ever be required thus making the emergency float unnecessary.

I claim as my invention:

1. An oil and gas separator comprising a vertically arranged cylindrical shell; an oil discharge spout dividing said shell into a separating chamber and an oil collection chamber; an oil discharge pipe on said spout extending downwardly into said collection chamber; an oil and gas inlet pipe for said separating chamber; a gas outlet pipe for said separating chamber; an oil outlet pipe for said collection chamber below the top of said chamber and disposed to maintain a body of oil in said collection chamber, and a water outlet at the bottom of said collection chamber.

2. An oil and gas separator comprising a vertically arranged cylindrical shell; an oil discharge spout dividing said shell into a separating chamber and an oil collection chamber; an oil discharge pipe on said spout extending downwardly into said collection chamber; an oil and gas inlet pipe for said separating chamber; a gas outlet pipe for said separating chamber; an oil outlet pipe for said collection chamber below the top of said chamber disposed to maintain a body of oil in said collection chamber; and means for venting said oil collection chamber and said oil discharge pipe, and a water outlet at the bottom of said chamber.

3. An oil and gas separator comprising a vertically arranged cylindrical shell; an oil discharge spout dividing said shell into a separating chamber and an oil collection chamber; an oil discharge pipe on said spout extending downwardly into said collection chamber; an oil and gas inlet pipe for said separating chamber; a gas outlet pipe for said separating chamber; an oil outlet pipe for said collection chamber below the top of said chamber disposed to maintain a body of oil in said collection chamber; means in said separating chamber for automatically regulating the volume of gas discharged through the gas outlet pipe, and a water outlet at the bottom of said chamber.

4. An oil and gas separator comprising a vertically arranged cylindrical shell; an oil discharge spout dividing said shell into a separating chamber and an oil collection chamber; an oil discharge pipe on said spout extending downwardly into said collection chamber; an oil and gas inlet pipe for said separating chamber; a gas outlet pipe for said separating chamber; an oil outlet pipe for said collection chamber disposed to maintain a body of oil in said collection chamber; and means for automatically regulating the volume of gas discharged through the gas outlet pipe; said regulating means consisting of a float mounted in said oil and gas separating chamber; and means operated by said float arranged to cover openings in said gas outlet pipe.

5. An oil and gas separator comprising a vertically arranged cylindrical shell; an oil discharge spout dividing said shell into a separating chamber and an oil collection chamber; an oil discharge pipe on said spout extending downwardly into said collection chamber; a gas outlet pipe for said separating chamber; an oil and gas inlet pipe for said separating chamber; an oil outlet pipe for said collection chamber disposed to maintain a body of oil in said collection chamber; means for automatically regulating the volume of gas discharged through the gas outlet pipe; said regulating means consisting of a vertically movable float mounted in said oil and gas separating chamber; a rod on the upper end of said float; and an open ended cylinder slidably extending over the inner end of said gas outlet pipe arranged to cover openings in said outlet pipe.

6. An oil and gas separator comprising a cylindrical shell consisting of a lower casing forming an oil collection chamber; an upper casing forming an oil and gas separating chamber; an oil and gas inlet pipe for said separating chamber; a gas outlet pipe for said separating chamber; an oil delivery pipe for said separating chamber extending downwardly into said oil collection chamber; a spout formed on the upper end of said oil delivery pipe forming a division wall between said oil collection chamber and said oil and gas separating chamber; an oil outlet pipe for said collection chamber below the top of said chamber arranged to maintain a body of oil in said collection chamber, and a water outlet at the bottom of said chamber.

7. An oil and gas separator comprising a lower casing forming an oil collection chamber; an upper casing forming an oil and gas separating chamber; an oil and gas inlet pipe for said separating chamber; a gas outlet pipe for said separating chamber; an oil delivery pipe for said separating chamber extending downwardly into said oil collection chamber; an oil outlet pipe for said collection chamber below the top of said chamber arranged to maintain a body of oil in said collection chamber; movable means mounted in said separating chamber for regulating the outflow of gas through said gas outlet pipe, and a water outlet at the bottom of said chamber.

8. An oil and gas separator comprising a casing forming an oil and gas separating chamber and an oil collection chamber; an oil and gas inlet pipe for said separating chamber; a gas outlet pipe for said separating chamber; an oil outlet pipe for said collection chamber below the top of said chamber, a water outlet at the bottom of the collection chamber; and means for regulating the flow of gas from said separating chamber through said gas outlet pipe consisting of a vertically movable float and an open ended cylinder connected to said float arranged to slidably extend over the inner end of said gas outlet pipe to cover openings in said outlet pipe.

In testimony whereof, I have hereunto set my hand at Breckenridge, Texas, this 16th day of July, 1921.

KENYON L. REYNOLDS.